United States Patent [19]

Kaufmann et al.

[11] Patent Number: 4,832,902
[45] Date of Patent: May 23, 1989

[54] REFUELING OF NUCLEAR REACTOR

[75] Inventors: John W. Kaufmann, Murrysville; Kenneth J. Swidwa, Harmar Township, Allegheny County; Leonard P. Hornak, North Huntington, all of Pa.

[73] Assignee: Westinghouse Electric Corp., Pittsburgh, Pa.

[21] Appl. No.: 382,269

[22] Filed: May 26, 1982

[51] Int. Cl.⁴ .............................................. G21C 19/00
[52] U.S. Cl. ..................................... 376/268; 376/258
[58] Field of Search ....................... 364/550, 556, 571; 376/245, 258, 260, 261, 262, 264, 268, 269, 270, 271

[56] References Cited

U.S. PATENT DOCUMENTS 3,893,090 7/1975 Neuner et al. ........................ 376/258
4,311,557 1/1982 Kowalski et al. .................... 376/271

Primary Examiner—Harold J. Tudor
Assistant Examiner—Richard Klein
Attorney, Agent, or Firm—H. Diamond

[57] ABSTRACT

Refueling apparatus for a nuclear reactor including a bridge and a trolley. The bridge is moveable in tracks along the containment of the pit in which the reactor is immersed in water and the trolley moveable in tracks on the bridge at right angles to the tracks on the bridge. The trolley carries a mast assembly for engaging, raising, lowering a nuclear-reactor component assembly involved in refueling. The mast includes an elongated member for engaging control-rod and thimble plug assembly and a gripper for raising fuel assemblies. The elongated member is moveable upwardly or downwardly.

The bridge, trolley and mast assembly each has a pulse generator which produces pulses in accordance with the movement of each. The number of pulses produced when the bridge, trolley or elongated member move to a position at a predetermined distance from a reference position is a measure of the new position of each.

The mast assembly can be positioned over the reactor at positions whose location can be set in terms of number of pulses as coordinates of a Cartesian coordinate system. The axes of the coordinate system are parallel to the directions of motion of the bridge and trolley. The elongated member likewise can be positioned vertically at a height whose location can be set by a coordinate measured by its number of pulses. As the bridge, trolley or elongated member move, limit switches are actuated by each at a predetermined position in its track. The signal produced by actuation of each switch yields a reading of the position of the bridge, trolley or elongated member at the instant of actuation and this is compared with a computer entry of the position which the vehicle in question should occupy. The computer is programmed to make a compensating correction in the position of the vehicle or elongated member.

11 Claims, 19 Drawing Sheets

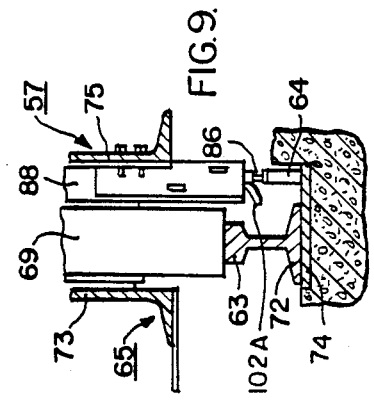
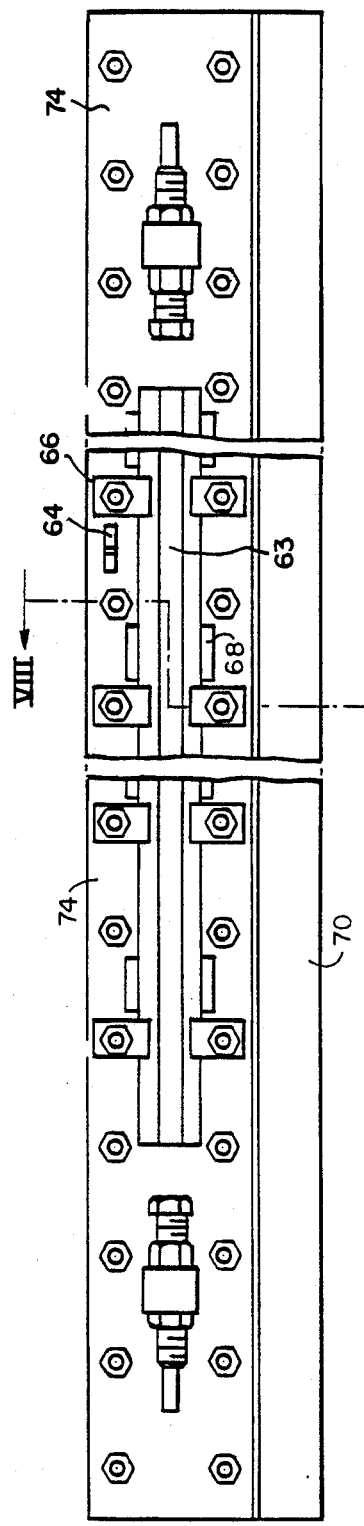
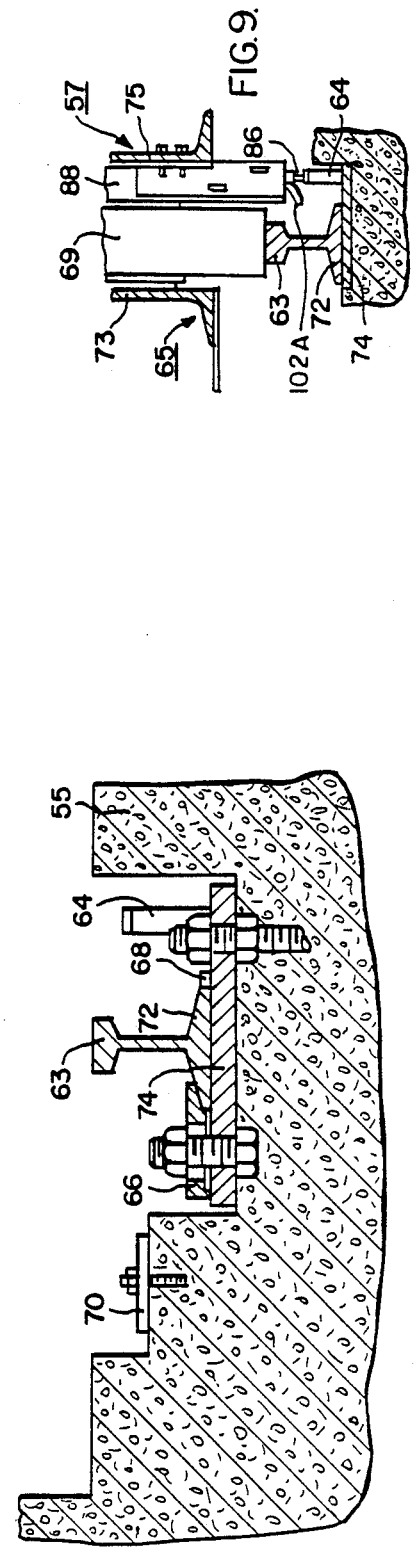

REFUELING OF NUCLEAR REACTOR

CROSS-REFERENCE TO RELATED APPLICATION

U.S. Pat. No. 4,511,531 granted Apr. 16, 1985 to Kenneth J. Swidwa, Leonard P. Hornak and Edward F. Kowalski for Transfer of Nuclear Reactor Component Assemblies and assigned to Westinghouse Electric Corporation (herein Swidwa). Swidwa is incorporated herein by reference.

BACKGROUND OF THE INVENTION

This invention relates to the art of nuclear reactor power plants. It has particular relationship to the refueling of the reactors of such plants. In carrying out the refueling, the reactor to be refueled is at the base of a pit in a containment filled with water to a depth of 20 or 30 feet. During refueling, component assemblies of the reactor or from refueling racks are engaged by grippers or grapples of a mast assembly, raised, transported from their position of origin and lowered into the position where they are to be deposited. The component assemblies are highly radioactive and are engaged, raised, transported and lowered under a substantial depth of water. To carry out this operation, there is provided apparatus including a bridge moveable along a track on the containment. A trolley is moveable on a track on the bridge. The trolley carries a mast assembly having a rotatable supporting mast from which the component-assembly engaging-raising-and-lowering means is suspended. This means is sometimes herein referred to as "component-assembly handling mechanism" or "assembly-handling mechanism" or simply "mechanism". With the bridge and trolley at selectably different positions along their tracks, the mast assembly is suspended with the assembly-handling mechanisms at selectably different positions of the area of the pit or of the reactor within the pit.

It is indispensable to successful refueling that the mechanism on the mast assembly be positioned during each operation to engage and raise the exact assembly which is selected for transport. Since the reactor is under water, the positioning of the mechanisms must be carried out with the necessary precision with at best a heavily clouded view of the nuclear core. It is also necessary that the depth of the mechanisms in the water be known. The tracks on the bridge and containment define a coordinate system whose coordinates serve to determine the positions of the mechanisms on the mast assembly. The tracks in Swidwa, and predominantly in prior art apparatus, are linear and at right angles to each other defining a Cartesian coordinate system. With the tracks of other configurations, other coordinate systems may define the positions of these mechanisms. For example, if the bridge moves in a circular track on the containment and the trolley moves on a radial track, the coordinate system would be a polar coordinate system.

The coordinates of the positions of the bridge and trolley along the tracks are magnitudes which indicate the positions of the engaging-raising-and-lowering means over the pit. In addition, there are provided indications of the vertical positions of these mechanisms. The mechanisms are raised or lowered by a hoist which is typically a winch.

In accordance with the teachings of the prior art the positions of the mast assembly along the tracks are derived from selsyn-type indicators. The readings of the indicators for different positions of the mechanisms of the mast assembly are compared with marks along the containment walls. The marks are coordinated with the indications of the selsyns by a calibration process. Impairment of the calibration was experienced and when this occurred, recalibration was a difficult and time consuming experience. The height of the mechanisms on the mast assembly was determined from marks on a tape along the assembly. Recalibration in this case was also difficult and time consuming.

In accordance with the teachings of the prior art, index marks were also provided on the trolley and bridge to locate the component assemblies to be moved in the reactor core. The index marks served to position the mast assembly over the theoretical location of a component assembly. If the assembly is out of position, difficult visual determinations were required to make the necessary adjustments. This operation was time consuming and required the utmost caution to preclude damage to the component assemblies.

It is the object of this invention to overcome the difficulties and drawbacks of the prior art. An object of this invention is to provide refueling apparatus for a reactor having facilities, whose calibration shall be maintained throughout a refueling operation, for reliably and precisely identifying the position of the mast assembly with reference to the reactor core. A further object of this invention is to provide refueling apparatus including position-visual facilities for aligning the mast assembly with the component assembly to be transported for identifying and recording the location of component assemblies to be transferred and, if desirable, to provide a permanent record of the refueling and core-mapping operation.

SUMMARY OF THE INVENTION

In apparatus in accordance with this invention, the trolley is provided with a pulse generator which produces pulses as the trolley moves along the track on the bridge. The pulses are entered as counts in a computer. Each pulse enters in the computer a positive count for each increment of movement of the trolley in a forward direction away from a reference point on the track and a negative count for each increment of the movement of the trolley in a backward direction towards the reference point. There is thus a one-to-one relationship between the position of the trolley on the track and the count of each train of pulses measuring the increments from the reference point to a position. Likewise the bridge is provided with a pulse generator which produces pulses resulting in a positive count in the computer for each increment of the forward movement of the bridge on the track on the containment walls from a reference point and a negative count for each increment of backward movement. The drive for the hoist also has a pulse generator which produces pulses resulting in a positive count in the computer for each increment of forward, typically downward, movement of the component-assembly-handling mechanism from a reference point and a negative count for each increment of backward, typically upward, movement of this assembly-handling mechanism from the reference point. For each set of positions of the trolley, bridge and handling mechanism, the computer contains digital entries which identify these positions.

The apparatus may be calibrated so that each set of counts defines the position of the trolley, bridge and component-assembly handling mechanism relative to a known predetermined component assembly in the core. To test the integrity of the calibration and reset the coordinate system if the calibration is impaired, a limit switch is actuated by each, the trolley, bridge and handling mechanism at a predetermined position along its path. The switch may be carried by the vehicle and may be actuated by a cam along its path or it may be provided at the position along the path and actuated by a cam on the vehicle. The actuation by the trolley and bridge takes place at a convenient position along their tracks. In the case of the handling assembly, the limit switch is typically actuated at the maximum height of this assembly. The actuation of each limit switch is entered in the computer together with the count at the position where each limit switch is actuated. The memory of the computer carries intelligence of the counts that should be entered for the actuation of the limit switches if the calibration is maintained. The memory is programmed to recalibrate the coordinate system if there is a disparity between a count entered in the memory and a count entered on actuation of a limit switch.

BRIEF DESCRIPTION OF THE DRAWINGS

For a better understanding of this invention, both as to its organization and as to its method of operation, together with additional objects and advantages thereof, reference is made to the following description taken in connection with the accompanying drawings, in which:

FIG. 7 is a plan view of the track assembly for the bridge;

FIG. 8 is a view in transverse section taken along line VIII—VIII of FIG. 7;

FIG. 9 is a fragmental view in transverse section taken along line IX—IX of FIG. 2;

DETAILED DESCRIPTION OF THE EMBODIMENT

Figure 1:
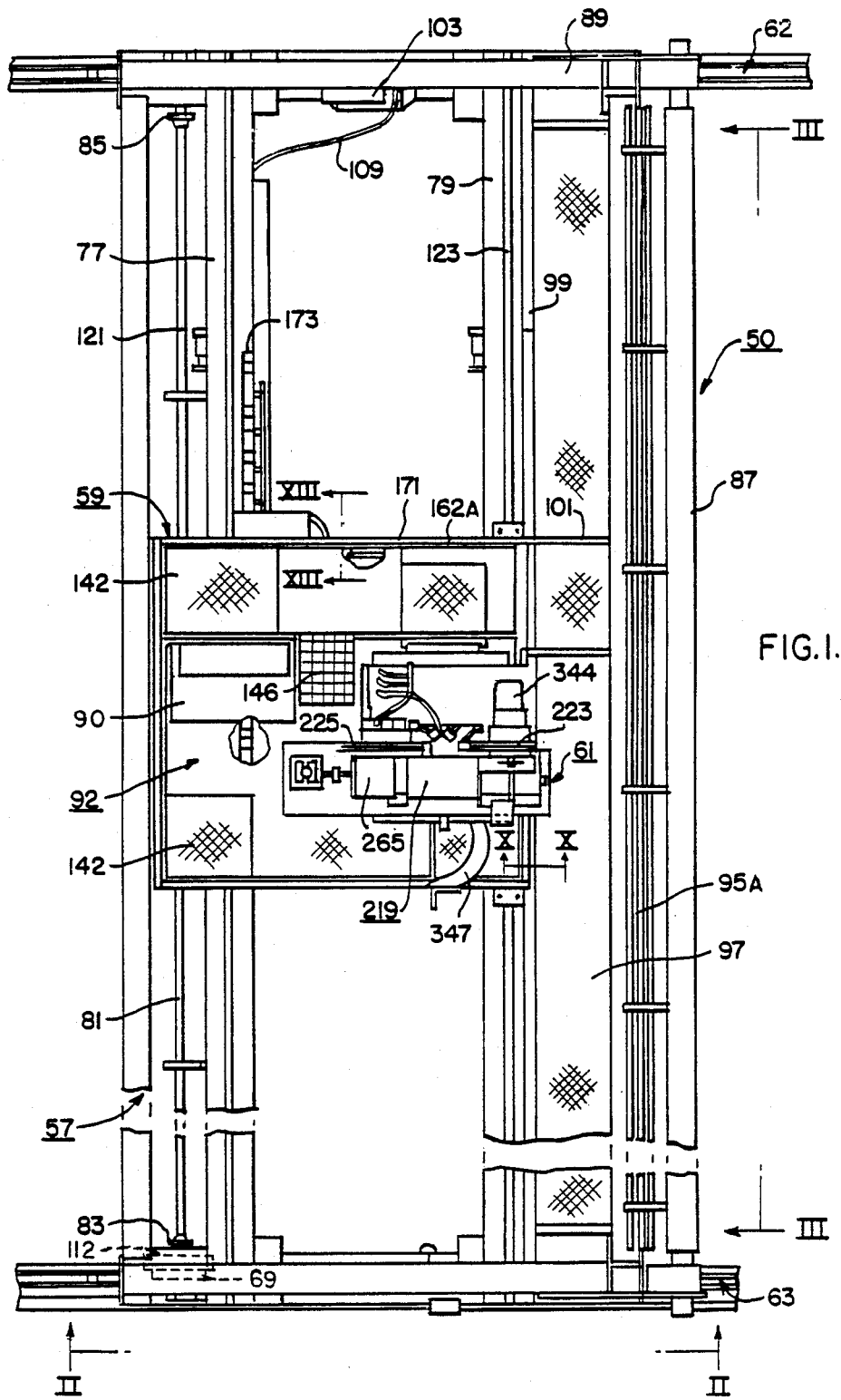
FIG. 1 is a plan view of apparatus in accordance with this invention.

The apparatus 50 (FIGS. 1,2) for refueling a nuclear reactor shown in the drawings serves to engage selected component assemblies of a nuclear reactor 51 (FIG. 3), raise these components, transport them and lower them into a selected position. The general operation of this apparatus 50 and the purposes which it serves is disclosed in Swidwa. The reactor 51 is disposed in a pit under water 53, (FIG. 2) 20 or 30 feet in depth in a containment defined by massive walls 55.

The apparatus 50 includes a bridge 57, a trolley 59 and a mast assembly 61 (FIGS. 1, 2, 3, 3C, 3D, 16, 27A). The bridge is moveable on rails or tracks 62 and 63 (FIGS. 1, 7, 8, 9, 12). These tracks are similar except that track 63 has a position verification cam 64 (FIGS.

7, 8,9). The tracks 62 and 63 are supported on base plates 74 in slots on the tops of opposite walls 55 (FIG. 8). Normally the slots are filled with grout (not shown). As shown for track 63 in FIGS. 7 and 8, each track is held down by rail clips 66 which engages a flange 72 along one side. Lateral movement is suppressed by a keeper 68 (FIG. 8) along the opposite side. Indicator strip 70 extend along one side of track 63. The indications from the strips 70 are picked up by a television camera (not shown) on the bridge.

Figure 2:
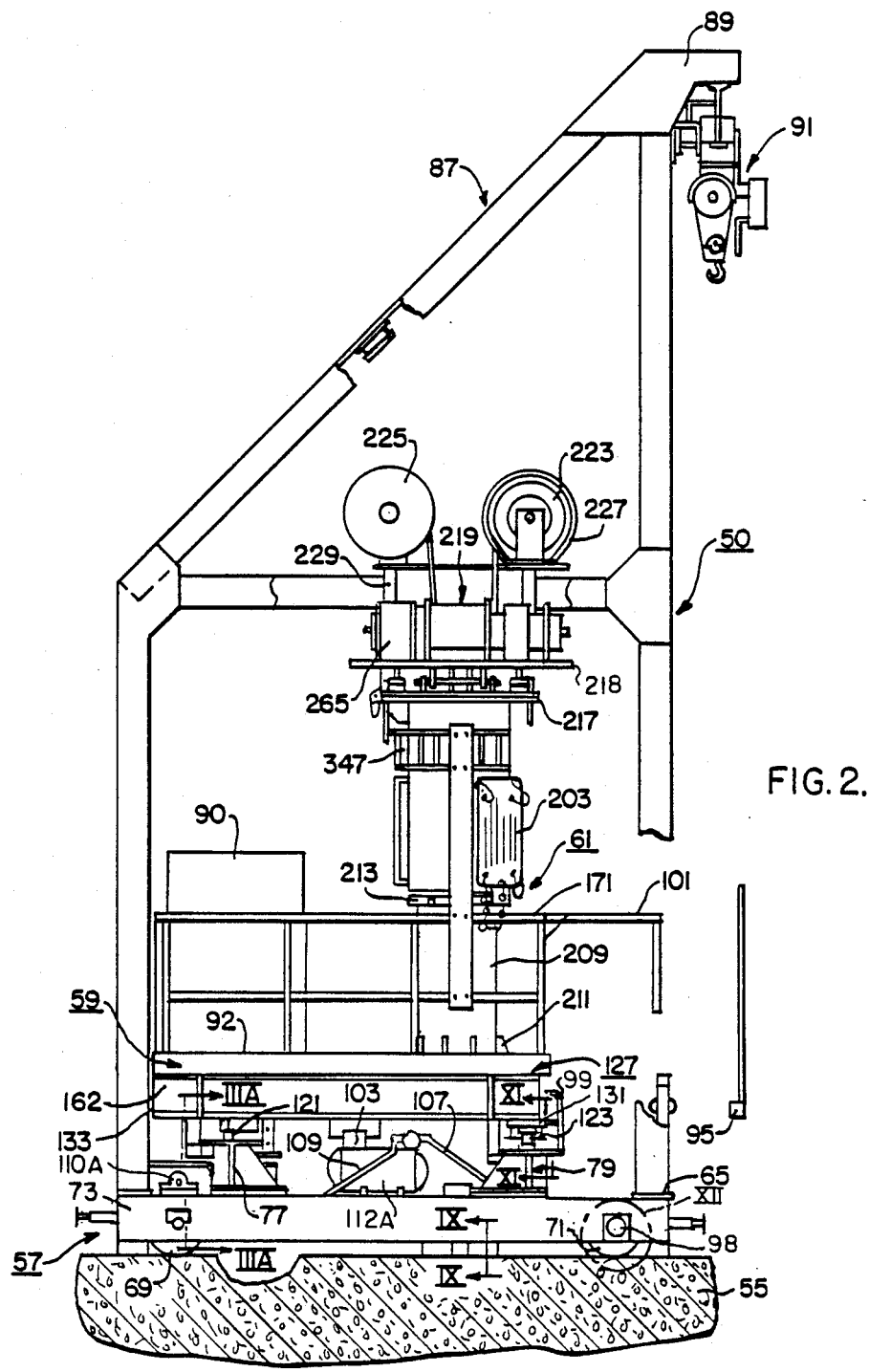
FIG. 2 is a view in end elevation in the direction of the arrows II—II of FIG. 1.
Figure 3:
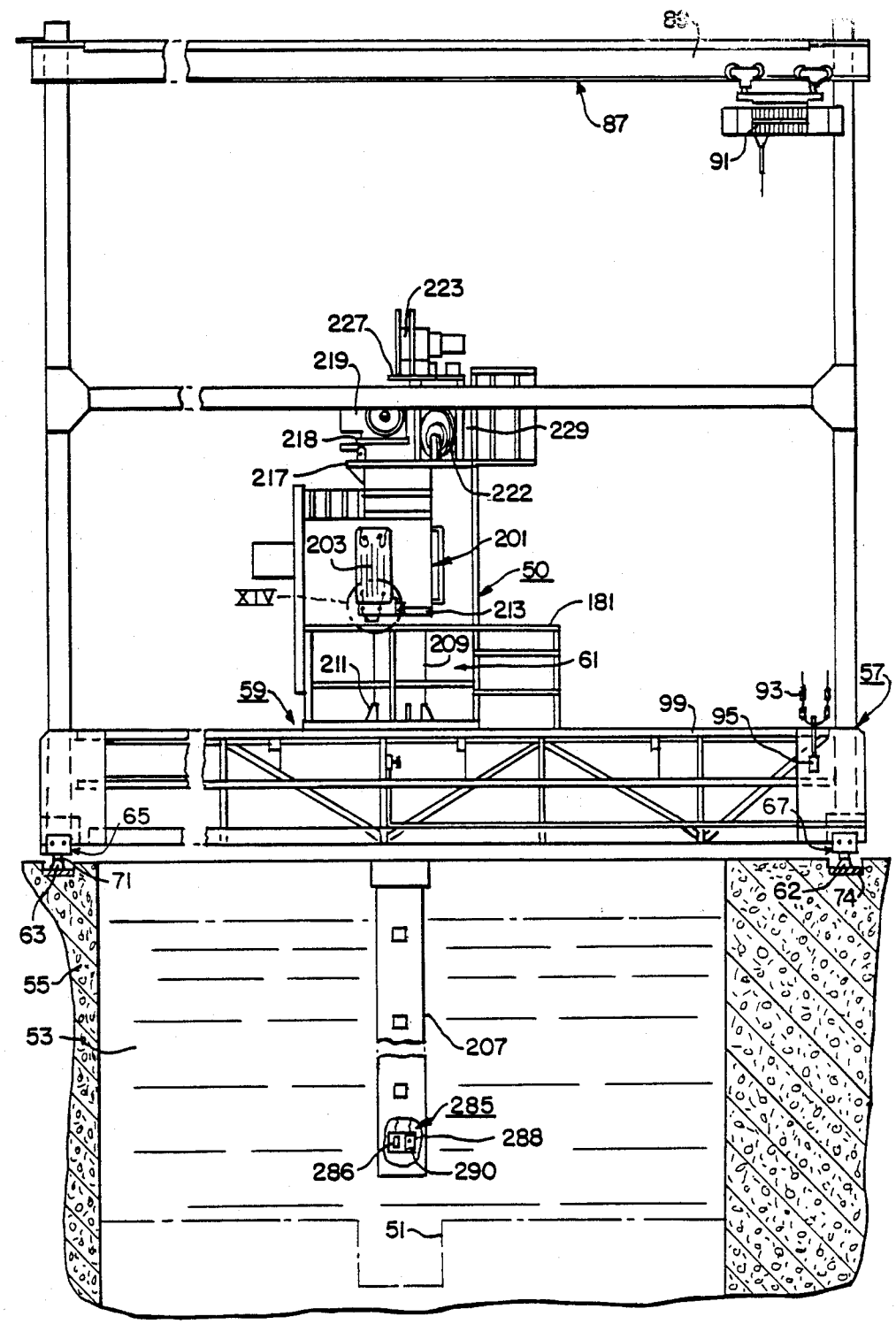
FIG. 3 is a view in side elevation in the direction of the arrows III—III of FIG. 1.
Figure 3A:
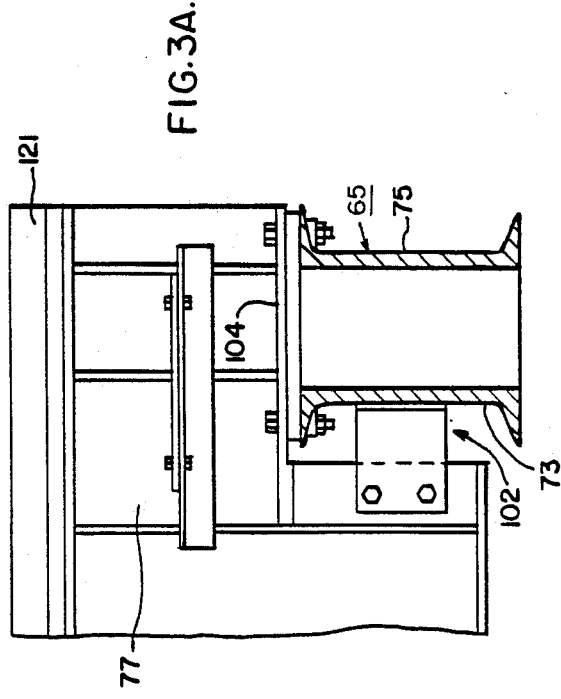
FIG. 3A is a fragmental view in section taken along line IIIA—IIIA of FIG. 2 showing the manner in which the channels which form a truck of the bridge supports the I-beams of the bridge.

The bridge 57 includes trucks 65 and 67 (FIGS. 2, 3A, 9). Each truck has a driven wheel 69 and an idler wheel 71 on shafts extending between back-to-back channels 73 and 75. I-beams 77 and 79 interconnect the trucks 65 and 67. I-beam 77 is adjacent the driven wheels 69. The channels 73 and 75 extend through cut-outs 102 in each beam 77 and 79. Plates 104 welded to the webs of the I-beam are bolted to the upper flanges of the channel. FIG. 3A shows this structure for I-beam 77 which is adjacent the driven wheels 69.

Figure 3B:
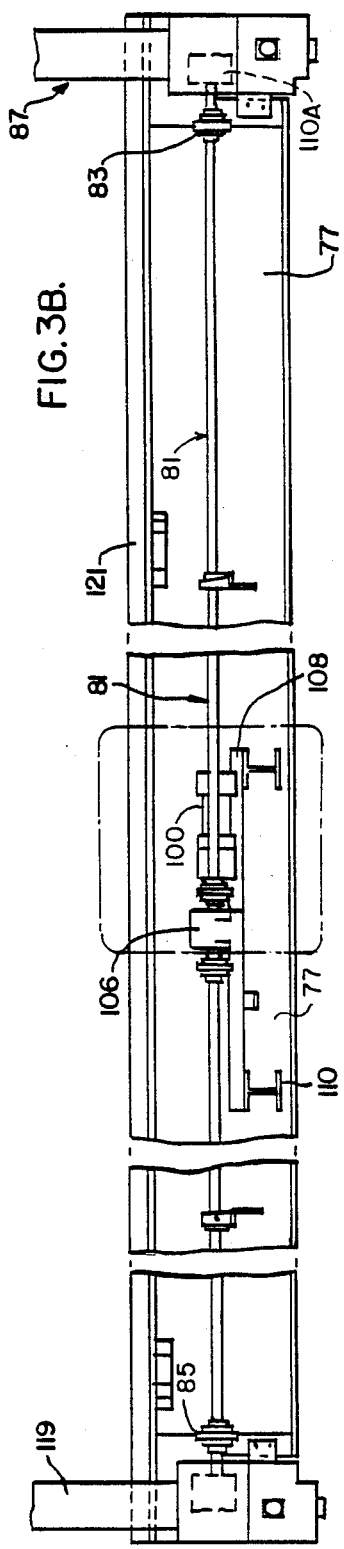
FIG. 3B is a view in side elevation showing the manner in which the I-beam of the bridge supports the motor which drives the driven wheels.
Figure 3C:
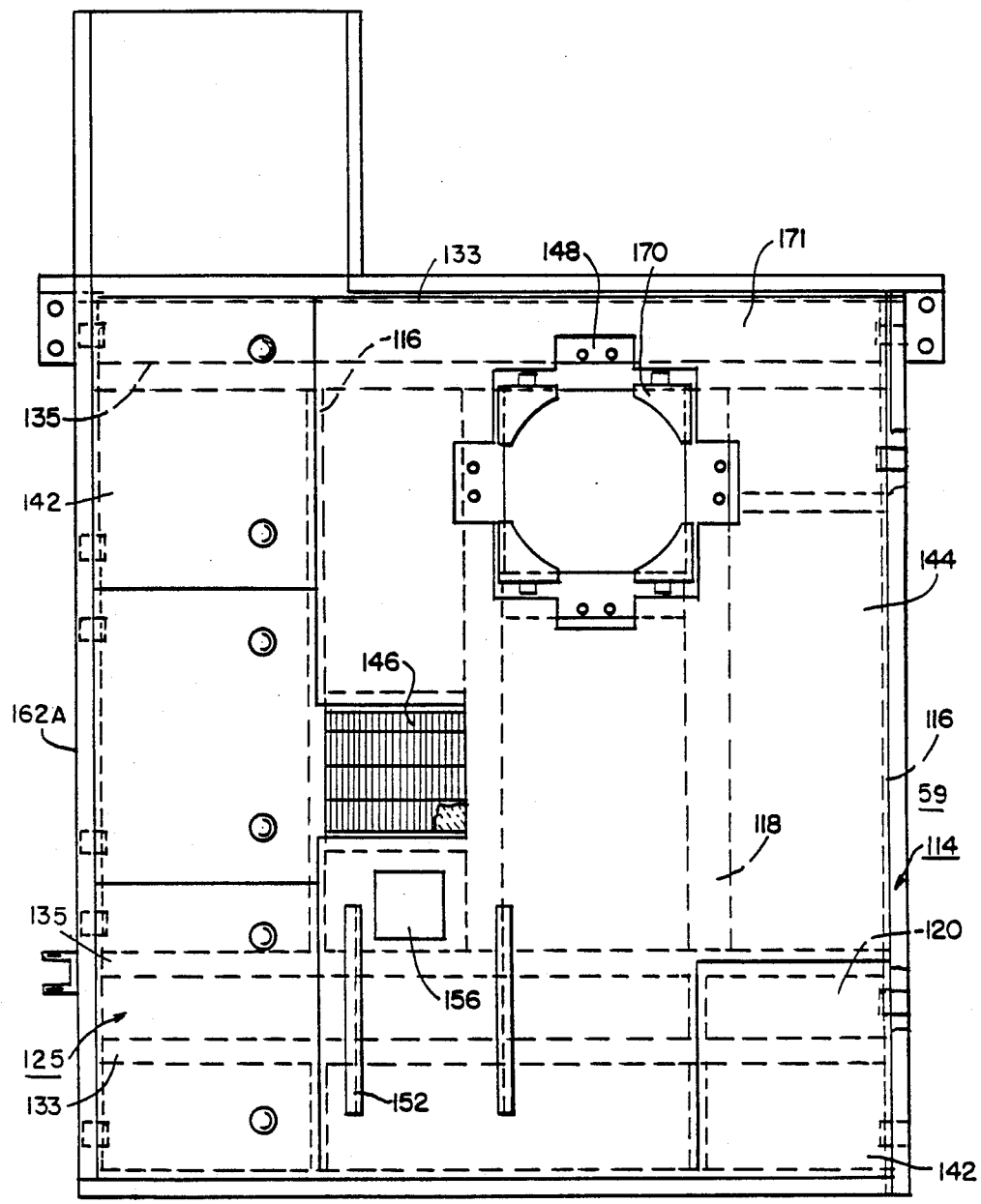
FIG. 3C is a plan view enlarged, turned 90° with reference to FIG. 1, of the trolley, with parts broken away, to show with the control console and mast assembly removed.

The wheels 69 are driven by motor 100 through speed reducer 106 (FIG. 3B). The motor 100 and speed reducer 106 are mounted on a bracket 108 welded to the web of I-beam 77 and supported on small I-beams 110 welded to I-beam 77.

The motor 100 drives shaft 81 (FIGS. 1, 3B) whose sections are connected through couplings 83 and 85 to pinions 110A. Each pinion engages a gear 112 (FIG. 1) on driven wheel 69. Wheels 69 are rotatable on sleeve bearings (not shown) on their shafts. Wheels 71 are secured to their shafts 98. The shafts 98 are rotatable on bearing cartridges 80 (FIGS. 4, 12) which are journaled in the channels 73 and 75.

One idler wheel 71 drives a pulse generator or pulser 76 (FIG. 4) which produces pulses that measure the movement of the bridge 57 from a reference position. A pulley wheel 78 is keyed to the shaft 98 with which one of the wheels 71 is rotatable on bearing 80. Pulley wheel 78 drives a second pulley wheel 82 of very much smaller diameter than pulley 78 through a timing belt 84. The pulser 76 produces pulses at a far higher rate than the rate of rotation of the wheel 71. The position of mast assembly 61 along tracks 63 and 65 is measured by the number of pulses produced by the pulser 76 as the mast assembly moves from the reference position to the position in question.

A verification limit switch 86 is supported on a bracket 88 suspended from channel 75 (FIGS. 8, 9). The limit switch 86 is actuable by the position verification cam 64 when the bridge 57 passes over the cam. Initially the apparatus is calibrated so that the position of the cam 64 corresponds to the number of pulses produced by pulser 76 as the bridge moves from the reference position to the position of the cam.

Figure 4:
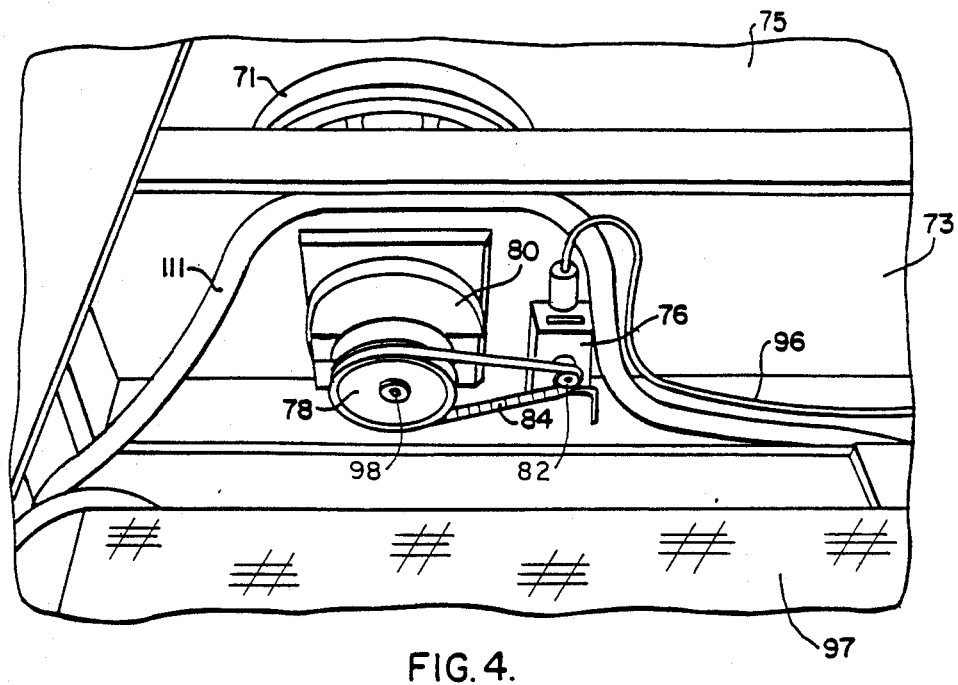
FIG. 4 is a copy of a photograph showing the pulse generator, which produces pulses to measure the position of the bridge along its track, and the manner in which the pulse generator is driven.
Figure 17:
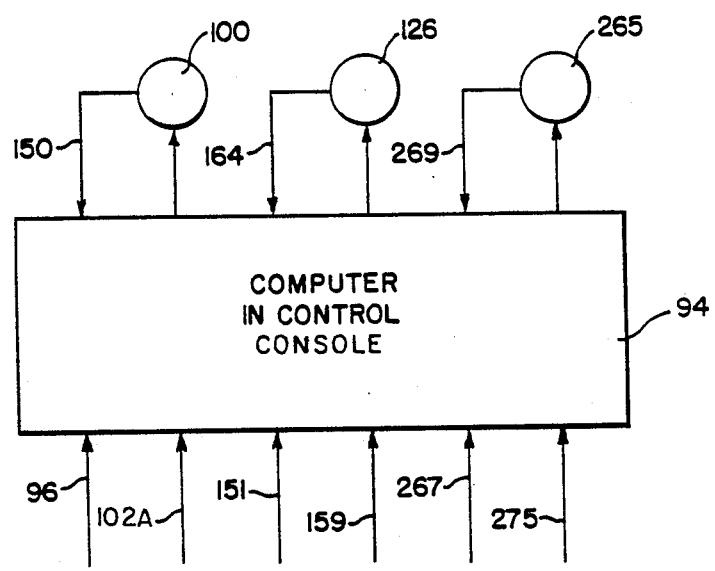
FIG. 17 is a block diagram showing the manner in which the coordinate system of the apparatus in accordance with this invention is recalibrated.

A control console 90 (FIG. 2) is mounted on the trolley deck 92. The console includes a computer 94 (FIG. 17) with a memory. The pulser 76 is connected to the computer through conductor 96 (FIGS. 4, 17). The count of the train of pulses from the reference position to any position of the bridge 57 is entered in the computer. Through line 150 from motor 100 (FIG. 17), the computer receives intelligence of the direction of movement of the bridge and it is programmed to add to the number of pulses if the direction is forward from the reference position and to subtract from the number of pulses if the direction is backward. The intelligence of actuation of limit switch 86 is also entered in the computer 94 through conductor 102A (FIGS. 9, 17). The calibrated count corresponding to the actuation of switch 86 is also entered in the computer. The computer is programmed to correct the calibration if the actual count deviates from the calibrated count.

A frame-like super structure 87 (FIG. 2) is bolted to the trucks 65 and 67 of the bridge spanning the trucks. The super structure 87 has an overhang 89 (FIG. 2) at the top which carries a hoist 91 for tools. The hoist 91 may be moved between the opposite walls 55 of the pit by a chain 93 (FIG. 3). The hoist be operated by a pushbutton switch 95 suspended from the hoist. Power is supplied to the hoist 91 by power track 95A (FIG. 1). Some of the tools which are used with hoist 91 are operated by compressed air. The bridge 57 is provided with a walkway 97 (FIG. 1) on one side.

A safety fence 99 to protect personnel from the trolley wheels extends along the walkway on the side of the pit. Handrails 101 extending frome the trolley permit personnel to step safely from the trolley 59 to the walkway.

Figure 5:
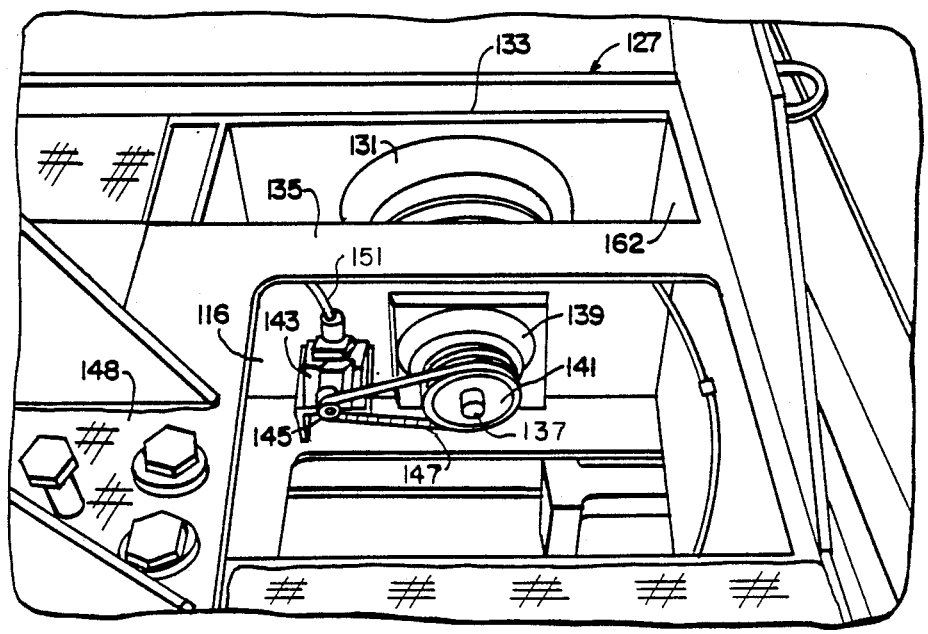
FIG. 5 is a copy of a photograph similar to FIG. 4 showing the pulse generator for the trolley and the manner in which the pulse generator is driven.
Figure 5A:
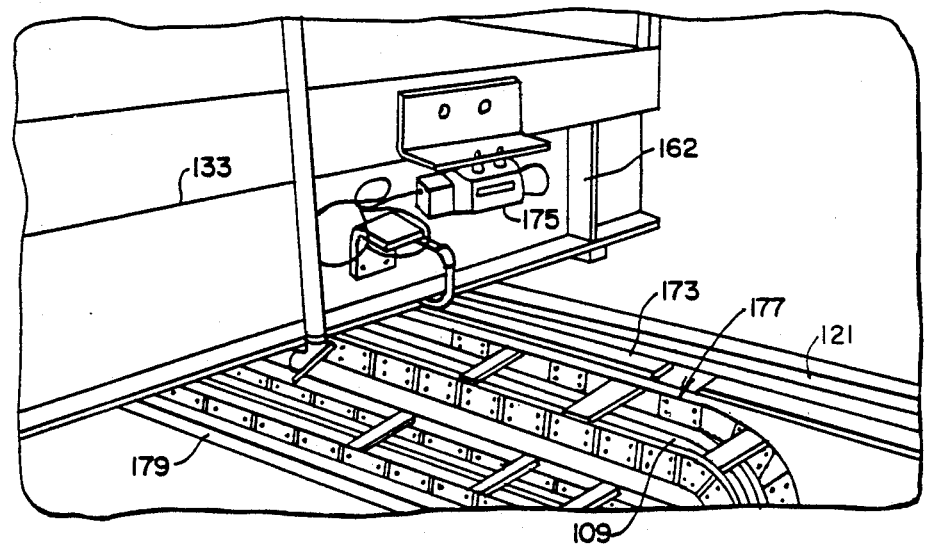
FIG. 5A is a copy of a photograph showing the cable tray between the bridge and trolley.

While the fluid for driving the fluid operable means may be of any type, the fluid typically used in the practice of this invention is compressed air. An assembly including a compressor 103 and a tank 112A and associated switch means and relief valves (FIG. 2, see also (FIG. 17)) is mounted on truck 65 of the bridge 57 to supply the compressed air. Air may be selectively supplied to the tools on hoist 91 through air hose 107 and by air hose 109 (FIG. 5A) to the trolley 59 for the air-operated devices on the mast 61.

The apparatus 50 is supplied with power from a power outlet (not shown) on the containment through a conductor 111 (FIG. 4). Between the outlet and the bridge 57 the power line includes a plurality of festoon loops (not shown).

Figure 3D:
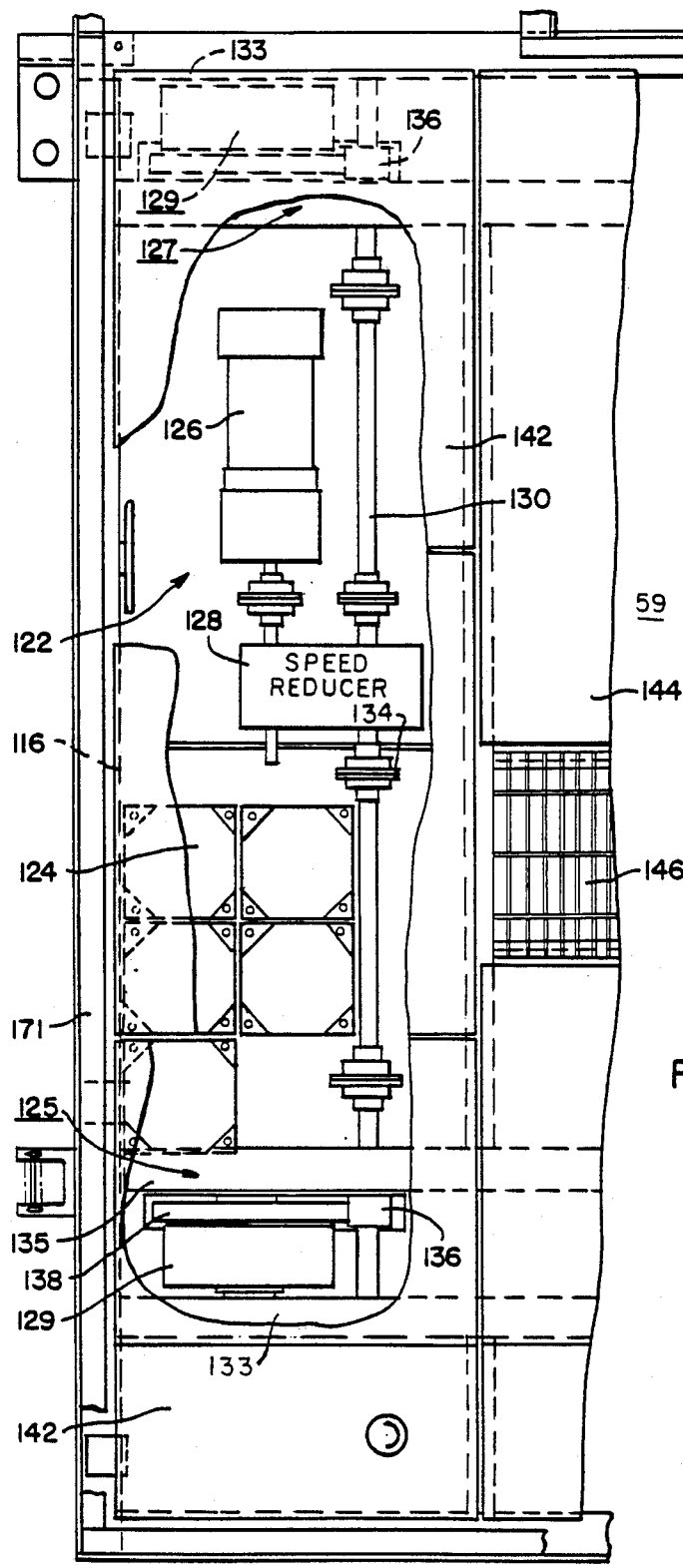
FIG. 3D is a fragmental plan view of the trolley the drive for the trolley.
Figure 10:
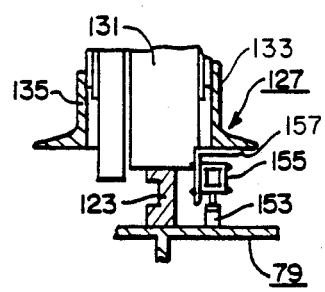
FIG. 10 is a fragmental view in transverse section taken along line X—X of FIG. 1.
Figure 11:
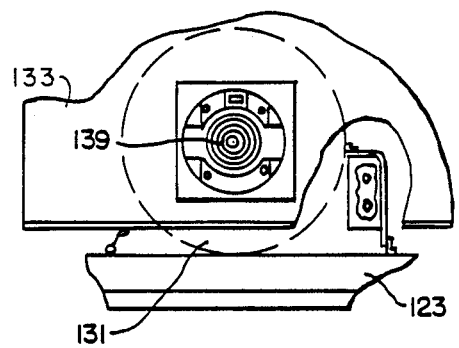
FIG. 11 is a fragmental view in the direction XI—XI of FIG. 2.
Figure 12:
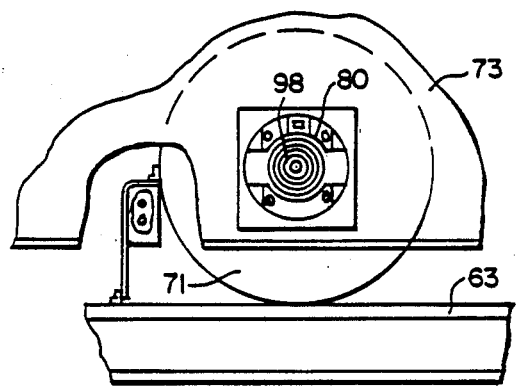
FIG. 12 is a fragmental view enlarged of the portion of FIG. 2 in circle XII.

The trolley 59 is moveable on tracks or rails 121 and 123 (FIG. 3D) on I-beams 77 and 79. Like the bridge 57 the trolley 59 is moveable along tracks 121 and 123 on trucks 125 and 127 (FIG. 3D). Each truck has a driving wheel 129 (FIG. 3D) and an idling wheel 131 (FIGS. 10, 11). Each pair of wheels is suspended from back-to-back channels 133 and 135. Each driven wheels 129 is rotatable on sleeve bushings on a shaft supported between a pair of channels 133 or 135, 133 on the outside and 135 on the inside. The channel units 133–135 are strengthened by gussets 162 (FIG. 2).

Figure 24:
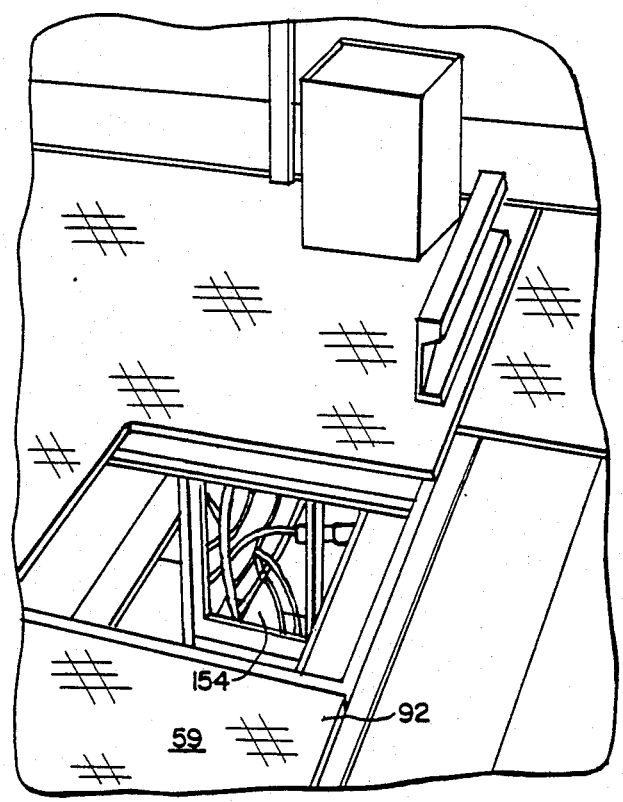
FIG. 24 is a copy of a photograph showing predominantly the junction box on the trolley through which the electrical conductors are connected to the facilities on the trolley, including the control console.

The supporting structures of the trolley 59 is a frame 114 formed of additional channels 116, I-beams 118 and plates 120 (FIG. 3C) welded to the channels 133 or 135 of the trucks 125 and 127. A long plate or platform 122 (FIG. 3D) is welded to the lower ends of the channels 133, 135, and 116 along the side 162A of the trolley 59 where the driving wheels 129 are suspended. This plate 122 carries the drive for the wheels 129 including a transformer 124, a motor 126 and speed reducer 128. The drive shaft 130 formed of sections connected by couplers 134 extends from the speed reducer 128. At its ends the drive shaft 130 is connected to pinions 136 which drive gears 138 connected to the wheels 129. The motor 126 is controlled from the computer 94 (FIG. 17) and feeds back its direction of rotation to the computer through line 164. At the top the frame 114 is covered by doors 142 (FIGS. 3C, 3D) and plates 144 which form the deck 92. The deck is provided with a grating 146 through which the pit under the trolley 59 may be viewed. The deck also has pads 148 (FIG. 3C) for supporting the mast assembly 61. Doors 170 are interposed between the pads 148. There are also supports 152 for the control console 90. There is an electrical junction box 154 (FIG. 24) under the trolley which is accessible through a hole in the deck 92 by removing grating 146.

Each idling wheel 131 is rotatable with a shaft 137 on bearing cartridges 139 supported by a channel 133 or 135. A toothed pulley wheel 141 (FIG. 5) is keyed to the shaft 137 of one of the idling wheels 131. This pulley wheel 141 drives a pulse generator or pulser 143 through a pulley wheel 145 of much smaller diameter through a timing belt 147. The pulser 143 is connected to computer 94 through conductor 151 (FIG. 17).

A verification cam 153 (FIG. 10) is mounted at a predetermined position along track 123. A verification limit switch 155 is mounted on a bracket 157 suspended from the channel section 133. The limit switch 155 is positioned to be actuable by the cam 153 when the trolley passes over the position of the cam. The actuation of the limit switch 155 is entered in computer 94 (FIG. 17) through line 159.

The cooperation of the pulser 143, the limit switch 155 and the computer 94 is similar to the cooperation in the case of the like components of the bridge 57. The number of pulses in a pulse train produced by pulser 143 as the trolley moves from a reference position to a given position along the tracks 121 and 123 measures the displacement of the given position from the reference position. The counts of pulses by the computer 94 is positive when the trolley 59 moves forward, away from the reference position, and negative when the trolley moves backward, towards the reference position. There is a one-to-one relationship between the count of positive pulses and each position of the trolley 59. The apparatus is calibrated so that the position of cam 153 on track 123 corresponds to a predetermined number of pulses which are entered in computer 94. If the calibration is impaired, there is a deviation between the number of pulses counted by the computer between the reference position and actuation of switch 155 and the entered calibration count. The computer is programmed to make a correction.

Figure 13:
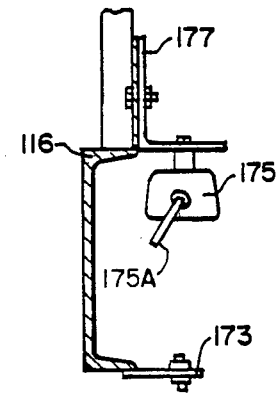
FIG. 13 is a fragmental view in transverse section taken along XIII—XIII of FIG. 1.

A handrail 171 (FIGS. 1 and 2) extends around the trolley deck 92. Adjacent the track 121 along the I-beam 77 there is an indicator strip 173 (FIG. 1, 13). This strip carries indications of positions along the pit in the direction of track 121. The indications on strip 173 are picked up by a television camera 175 (FIG. 13) suspended from a bracket 177A secured to the trolley 59. By viewing the screen of the viewer tube (not shown) on the control console 90, which is connected to camera 175, the operator can determine at first hand the approximate position of the trolley along the pit.

Figure 21:
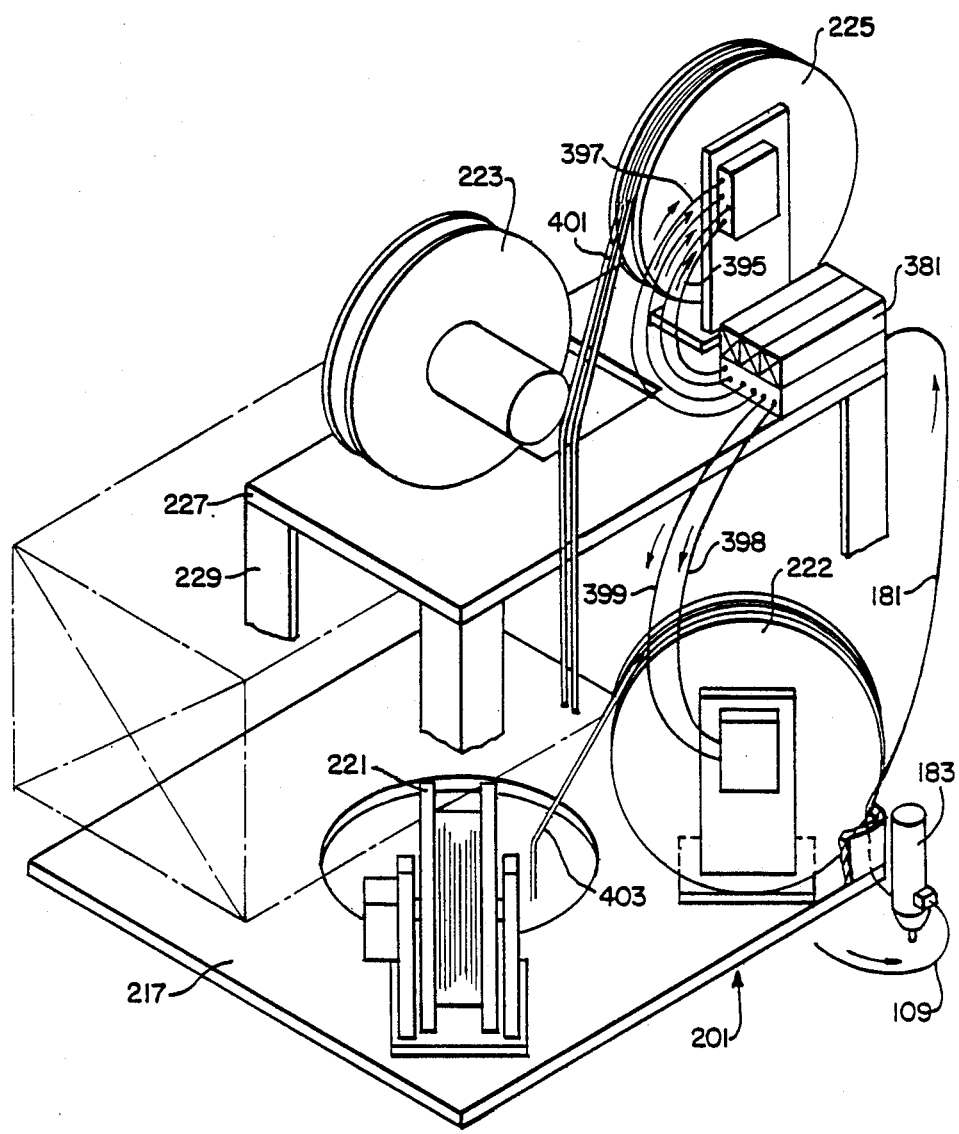
FIG. 21 is a view in isometric, generally diagrammatic, of the fluid and electric conductor reels as seen from the rear of the apparatus with reference to FIG. 2.

A cable tray 177 (FIGS. 5A) is connected at one end to a plate 179 suspended from I-beam 77 and at the other end to the underside of trolley 59 (deck 92). The slot of the cable tray 177, which carries the cables is horizontal. The cable tray carries the compressed-air hose 109, the power conductor 111, (FIG. 4), the conductor 102A from the verification switch 86 (FIG. 9) on the bridge 57, the conductor 96 from the pulser 76 (FIG. 4) on the non-driven wheel 71, and the conductor 175A from the 175 television camera. The cable tray 177 permits the bridge 57 and trolley 59 to travel relative to each other without disturbing the cables on the trolley side. Except for the compressed-air hose 109, the conductors on cable tray 177 are connected to the junction box 154 (FIG. 24) under the trolley and thence are connected to the console 90. The hose 109 is connected to the hose 181 on the mast assembly 61 through pressure regulator 183 (FIGS. 21). Conductors powered by line 111 also are connected from the junction box 154 to facilities on the mast assembly.

The mast assembly 61 is described in Swidwa. For any information in addition to that presented here that may be of interest, reference is made to Swidwa.

Figure 14:
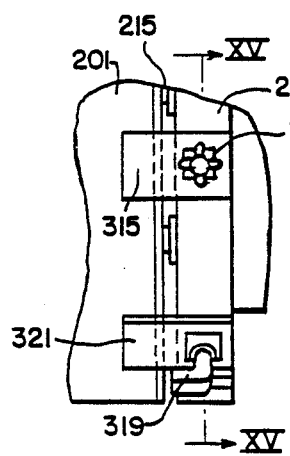
FIG. 14 is a fragmental view enlarged of the portion of FIG. 1 in circle XIV of FIG. 3.
Figure 15:
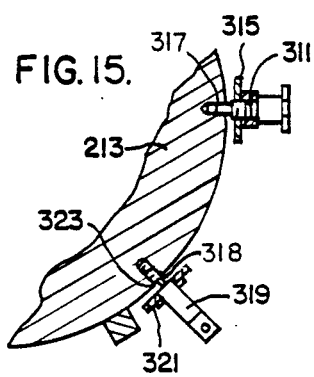
FIG. 15 is a fragmental view in longitudinal section taken along line XV—XV of FIG. 14.

The mast assembly 61 includes a supporting mast 201 (FIGS. 2, 3, 16, 22) of circular, transverse cross-section. The supporting mast 201 has windows 203 (FIGS. 2, 3, 16) through which the operation of the parts within the mast 201 may be observed. The supporting mast 201 is secured to ring 205 (FIG. 16) from which a long guiding mast 207 of circular transverse extends. The apparatus also includes an auxiliary mast or bearing mast 20 (FIGS. 2, 3, 16, 22). Brackets 211 extend from the auxiliary mast 209 near its lower end. These brackets engage the bracket pads 148 (FIG. 3C) on the deck 92 of the trolley 59. The auxiliary mast 209 has a flange 213 (FIGS. 14, 15, 16) at the top which carries a thrust-bearing ring 215. The ring 205 has a seat for the bearings 215, supporting mast 201 and the ring 205 and guiding mast 207 and other parts supported from the supporting mast are rotatable on the bearings 215.

Figure 16:
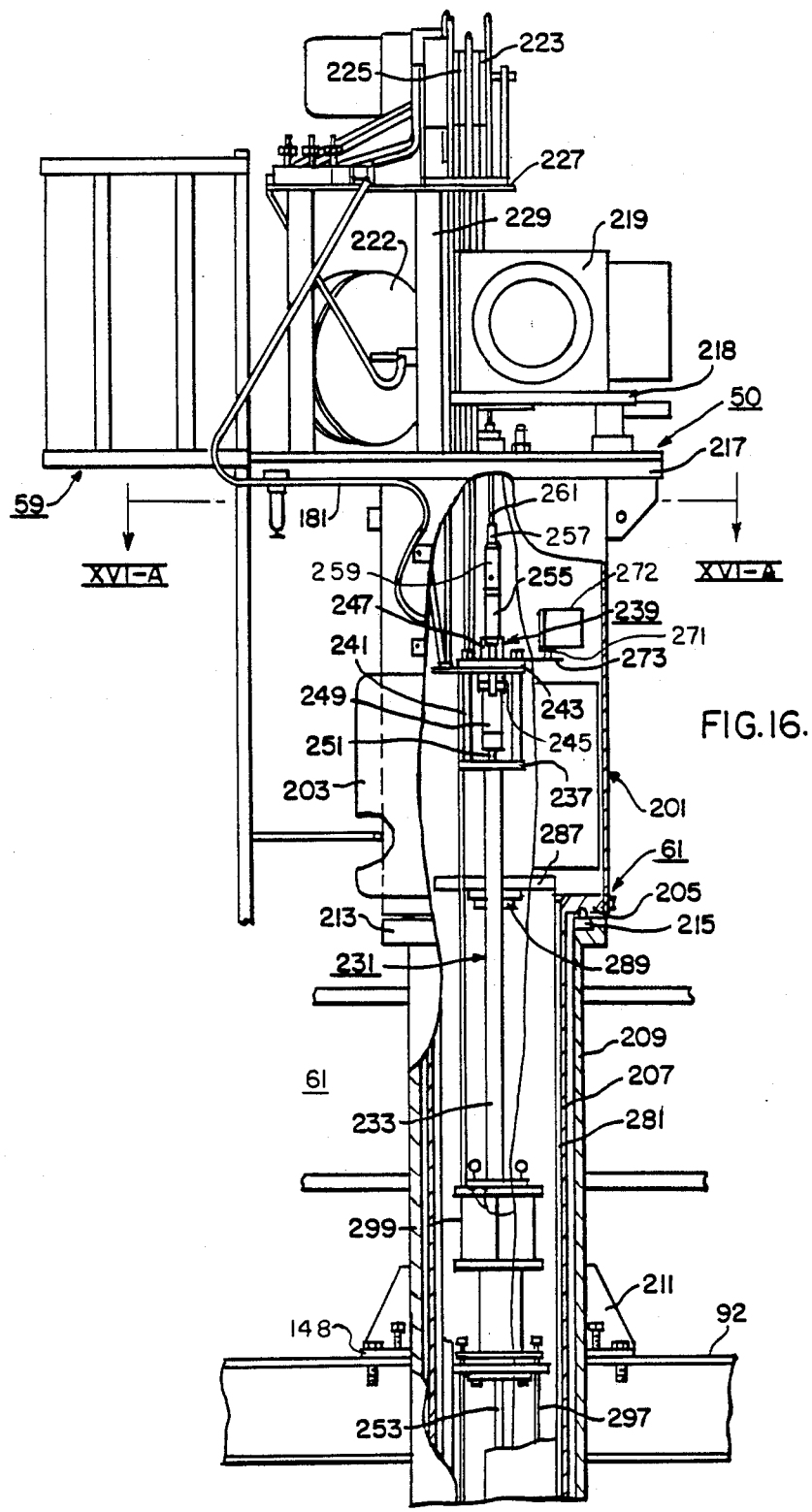
FIG. 16 is a view in side elevation with parts broken away and parts sectioned of the upper part of the mast assembly of apparatus in accordance with this invention showing the limit switch, which checks the calibration of the coordinate involved in raising and lowering the component-assembly handling mechanism, and the components of the mast which cooperate with the switch.
Figure 23:
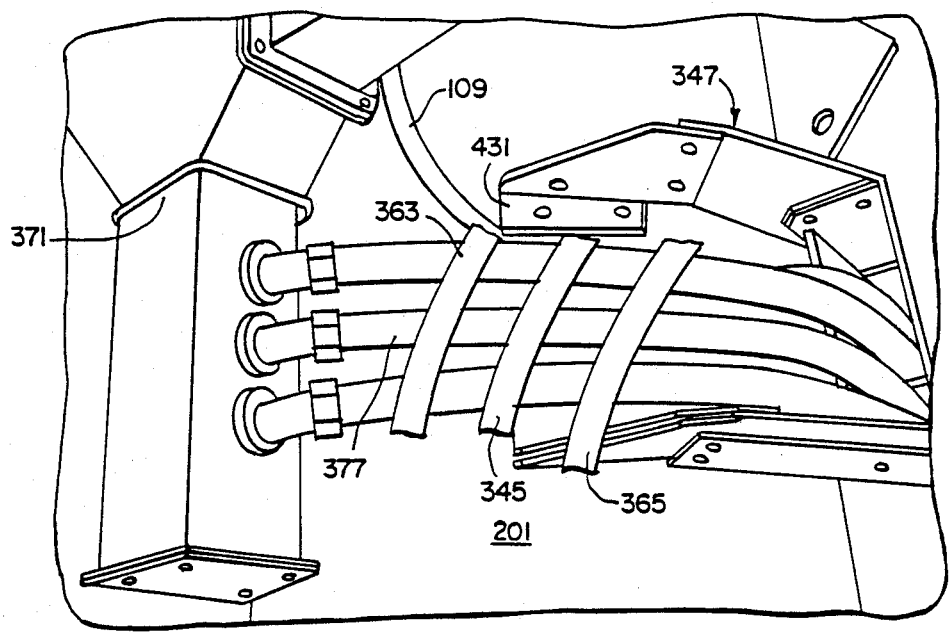
FIG. 23 is a copy of a photograph showing the manner in which the fluid and electric conductors enter the cable tray at the end where the cable tray is connected to the supporting mast.

The supporting mast 201 has a rectangular flange 217 at the top. There are supported directly on this flange 217 a platform 218 (FIGS. 2, 16), on which a winch 219 (FIGS. 2, 16) is mounted, and an electric conductor reel 221 (FIG. 23) and an air-hose reel 222 (FIGS. 16, 21). An additional reel 223 for electric conductors and an additional air-hose reel 225 is supported from a platform 227 mounted on legs 229 on flange 217 (FIGS. 16, 23). An elongated member 231 (FIG. 35) having at its lower end, grapples (not shown) for engaging a control-rod cluster (not shown) or a thimble-plug cluster (not shown) of the reactor 51 to be refueled, are moveable upwardly or downwardly by the winch 219. The elongated member 231 includes a tube 233 (FIG. 16) to the upper end of which a plate 237 is secured. The plate 237 is formed into a rigid mechanical unit with an upper-plate assembly 239 by four support rods 241. The rods 241 engage plate 237, and are secured by nuts to the plate 243 of the upper-plate assembly. The flange 245 (FIG. 16) of a yoke 247 engages the plate 243 and carries a cylinder 249, typically an air cylinder. The flange 245, plate 243 and cylinder 249 are connected together as a rigid unit. The piston rod 251 of cylinder 249 actuates a rod 253 to move upwardly or downwardly in the tube 233. When actuated to its utmost down position, the rod 253 causes the grapple (not shown) to engage the control rod assembly or thimble-plug assembly which is to be raised. In the up position of the rod 253, the grapple may be disengaged from the component assembly. Limit switches 254 and 256 (FIG. 18) are provided for signaling that the piston rod 251 is at its extreme positions. The yoke 247 is pivotally connected to the lower junctions of swivels 255. The upper junction of each swivel 255 is pivotally connected to a clevis 257. Each clevis 257 is suspended from a threaded member 259 at the end of a cable 261 from the winch 219.

Figure 6:
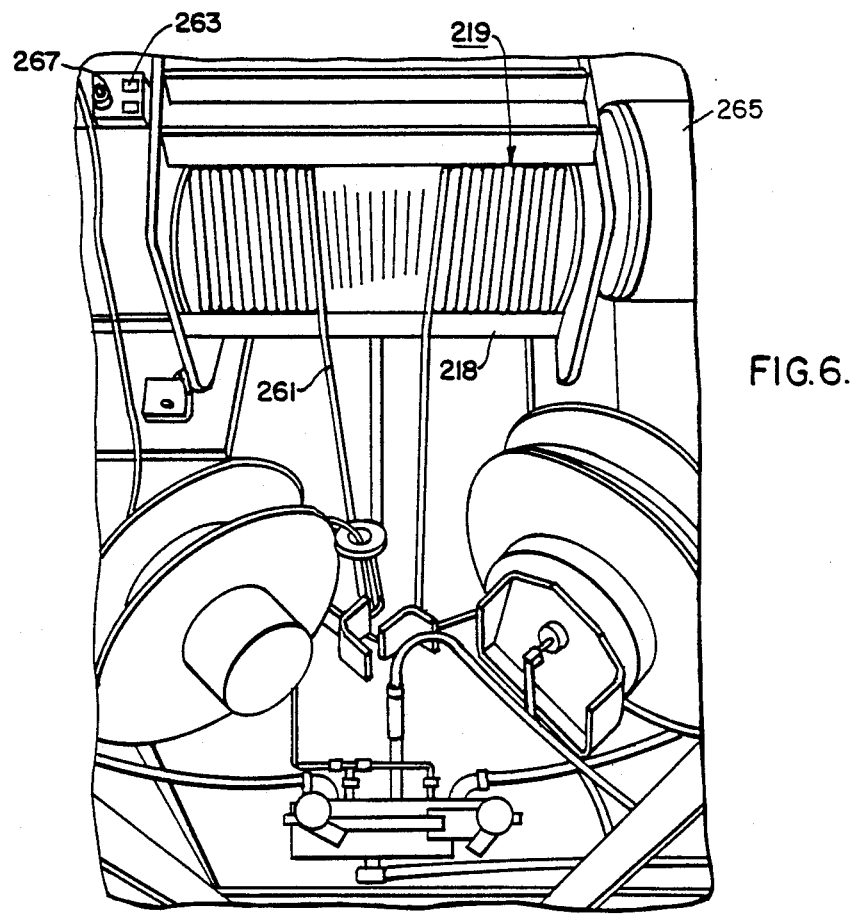
FIG. 6 is a copy of a photograph showing the pulse generator, which produces pulses which measures the position of the component-assembly handling mechanisms, and the manner in which the pulse generator is driven.
Figure 16A:
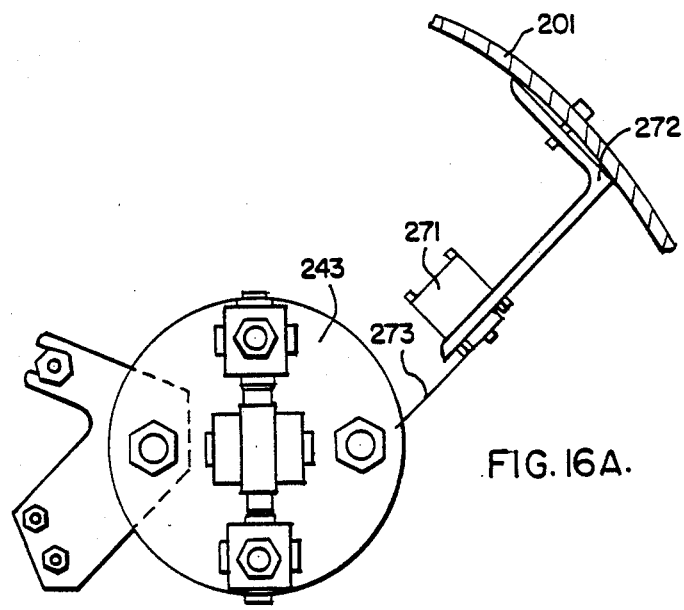
FIG. 16A is a partial fragmental view in section taken along line XVIA—XVIA of FIG. 16.

The winch 219 is provided with a pulse generator 263 (FIG. 6) which is actuable by a toothed member (not shown) driven by the winch motor 265 (FIGS. 1, 2) synchronously with the winch. The pulser 263 operates analogously to the pulsers 76 (FIG. 4) and 143 (FIG. 5) to produce trains of pulses whose number measures the height of the elongated member 231 (FIG. 16). The numbers of pulses are entered in the computer 94 through line 267 (FIGS. 6, 17). The winch motor 265 is controlled from the computer 94 and enters its direction of rotation in the computer through line 269. The numbers of pulses are entered in a positive sense when the elongated member 231 moves downwardly and in a negative sense when the mast moves upwardly so that there is a one-to-one relationship between the position of the member 231 and the net number of pulses entered in the computer 94. The apparatus may be calibrated so that the position of the elongated member for each number of pulses is known. A calibrated verification limit switch 271 is suspended from a bracket 272 of the supporting mast 201, (FIGS. 16, 16A). The switch 271 is actuable by a bar 273 on the switch which is in turn actuated by the plate 243 of the upper plate assembly 239 when the bar 273 is at the level of switch 271. The actuation of switch 271 is entered in the computer 94 through line 275 (FIG. 17). The computer is programmed to check if the indicated position of the limit switch 271 corresponds to the calibration of the elongated member position and to correct the calibration if there is a deviation.

The mast assembly also includes an inner mast or gripper mast 281 (FIG. 16). This mast 281 is of generally rectangular cross section composed of oppositely disposed channels formed into a rigid unit by cross snow-flake plates (FIG. 34), as shown in detail in Swidwa. The inner mast carries a gripper 285 (FIG. 3) for engaging a fuel assembly (not shown).

The supporting mast 201 may be locked in an initial position by a locking screw 311 (FIGS. 14, 15) operated by knob 313. The screw 311 and knob 313 are suspended from bracket 315 secured to the mast 201. When the knob 313 is turned the screw tip 317 penetrates into a hole in the flange 213 of the auxiliary mast 209. In the initial position of the supporting mast 201, the plunger 318 of a limit switch 319, supported from a bracket 321 in mast 201, is held in a predetermined setting by a cam 323 in the flange 213. When the mast 201 is rotated, this switch 319 is actuated.

Figure 19:
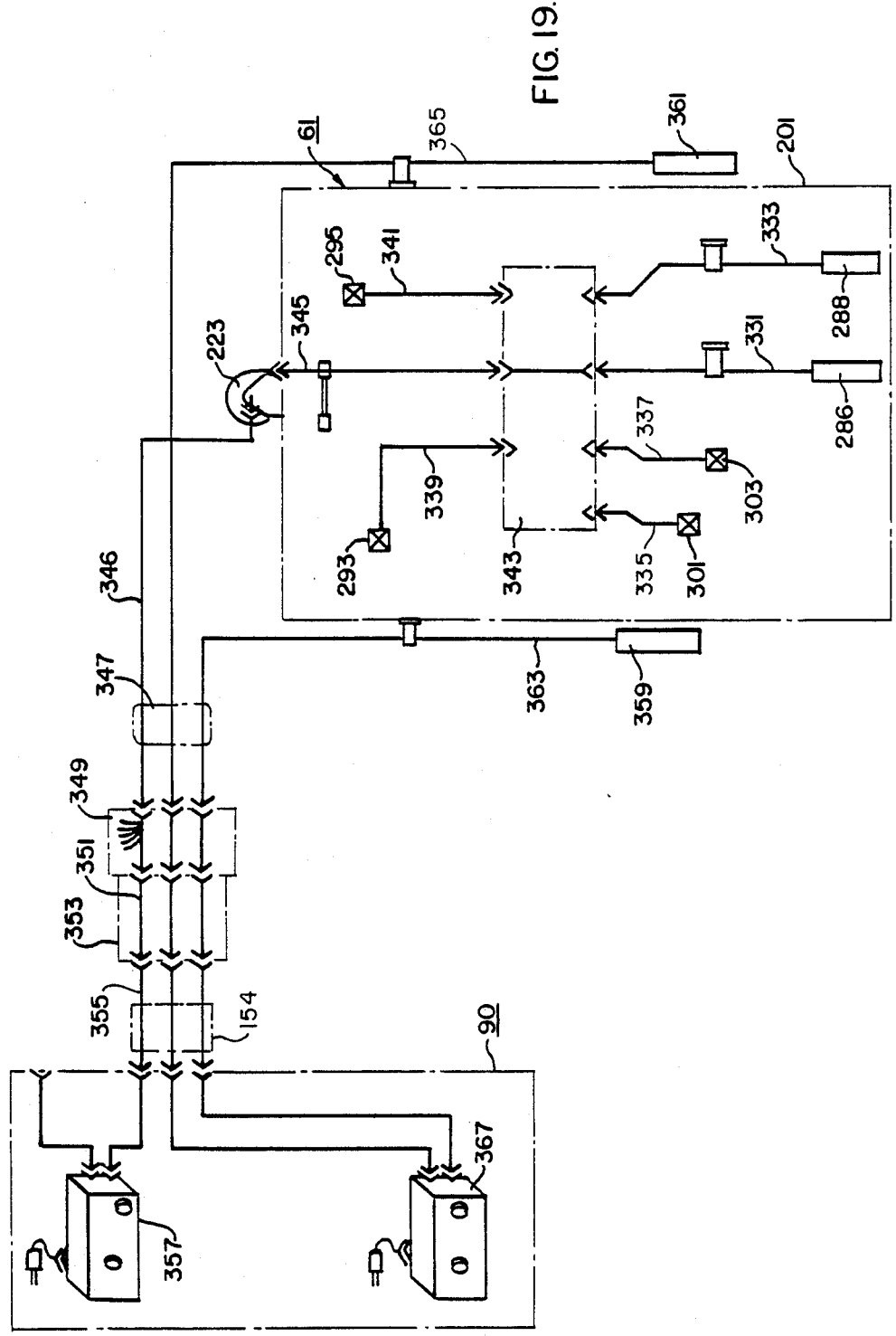
FIG. 19 is a schematic of the electrical system of the component-assembly handling mechanism of this invention.
Figure 20:
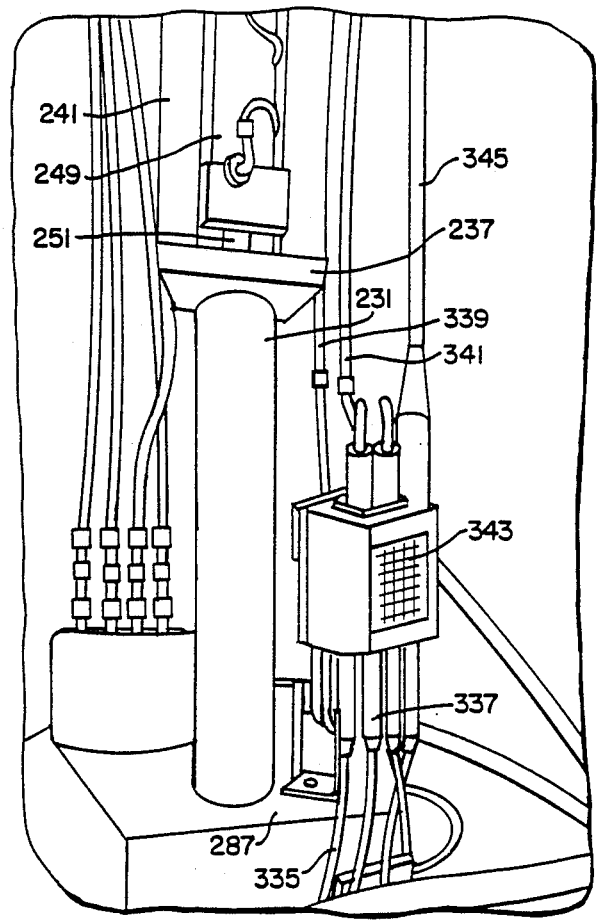
FIG. 20 is a copy of a photograph showing the manner in which the conductors on the component-assembly handling mechanisms are mechanically related to these mechanisms.

The disposition of electrical conductors on the mast assembly 61 in the practice of this invention will now be discussed with reference to FIG. 19. The heavy black lines in FIG. 19 each represents a cable or harness including a number of wires. The following cables are connected to parts which are moveable up or down with the elongated member 231 or the inner mast 281:

The cable 331 from the television camera 286 which serves for observation of the gripper assembly;

The cable 333 from the light source 288 associated with camera 288;

The cable 335 from the limit switch 301 which signals one setting gripper cylinder 299;

The cable 337 from the limit switch 303 which signals the opposite setting of cylinder 299;

The cable 339 from the limit switch 293 which signals one setting of cylinder 291 for the yoke;

The cable 341 from the limit switch 295, which signals the opposite setting of cylinder 291. These cables 331 through 341 are connected to the input terminals of junction box 343 (FIGS. 19) which is mounted on the plate 287 of the inner mast 281. The output cable or harness 345 from box 343, which includes conductors carrying the current of all input conductors is wound on cable reel 223 (FIGS. 1, 2, 3, 16, 21, 22). The conductors are connected through a slip ring system 344 (FIG. 1) to cable section 346 (FIG. 19). Cable section 346 passes through an additional cable tray 347 (FIGS. 1, 21, 22, 23) to junction box 349. Cable section 351 from the junction box 349 passes through wire way 353 to the junction box 154 (FIG. 32) under the deck 92 of the trolley 59. Cable section 355 from this junction box 154 is connected to a rack 357 (FIG. 19) in the control console 90. Television cameras 359 and 361 are mounted on guiding mast 209. Since this mast is not moveable, cables 363 and 365 for these cameras are connected directly, and not through a reel, to a rack 367 of console 90 through cable tray 347, junction box 349, wire way 353 and intermediate cable sections.

Figure 22:
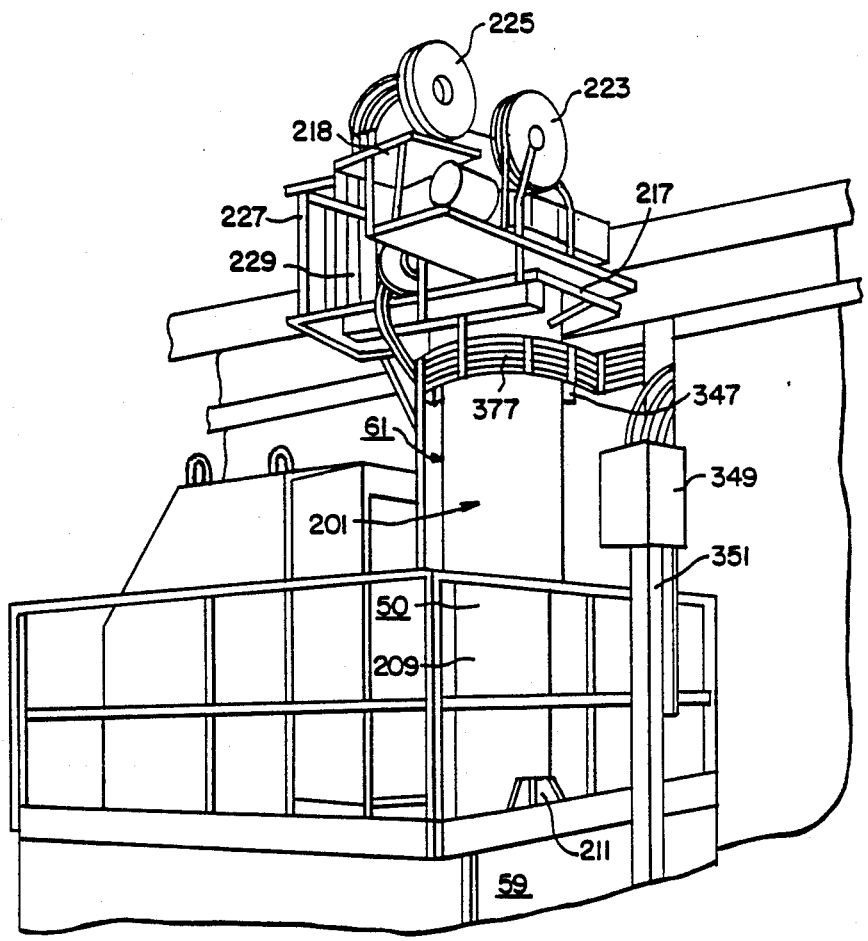
FIG. 22 is a copy of a photograph of the apparatus according to this invention showing predominantly the cable tray and its content.

The cable from limit switches 254 and 256 (FIG. 18) for the cylinder 249 which controls the movement of the elongated mast 231 is wound on reel 221 (FIG. 23). The cable from the slip ring (not shown) of this reel 221 and the conductors from the following components are passed through a Y wireway 371, (FIG. 27B) whence they pass through cable tray 347 in conduits 377 (FIGS. 22, 23).

Figure 18:
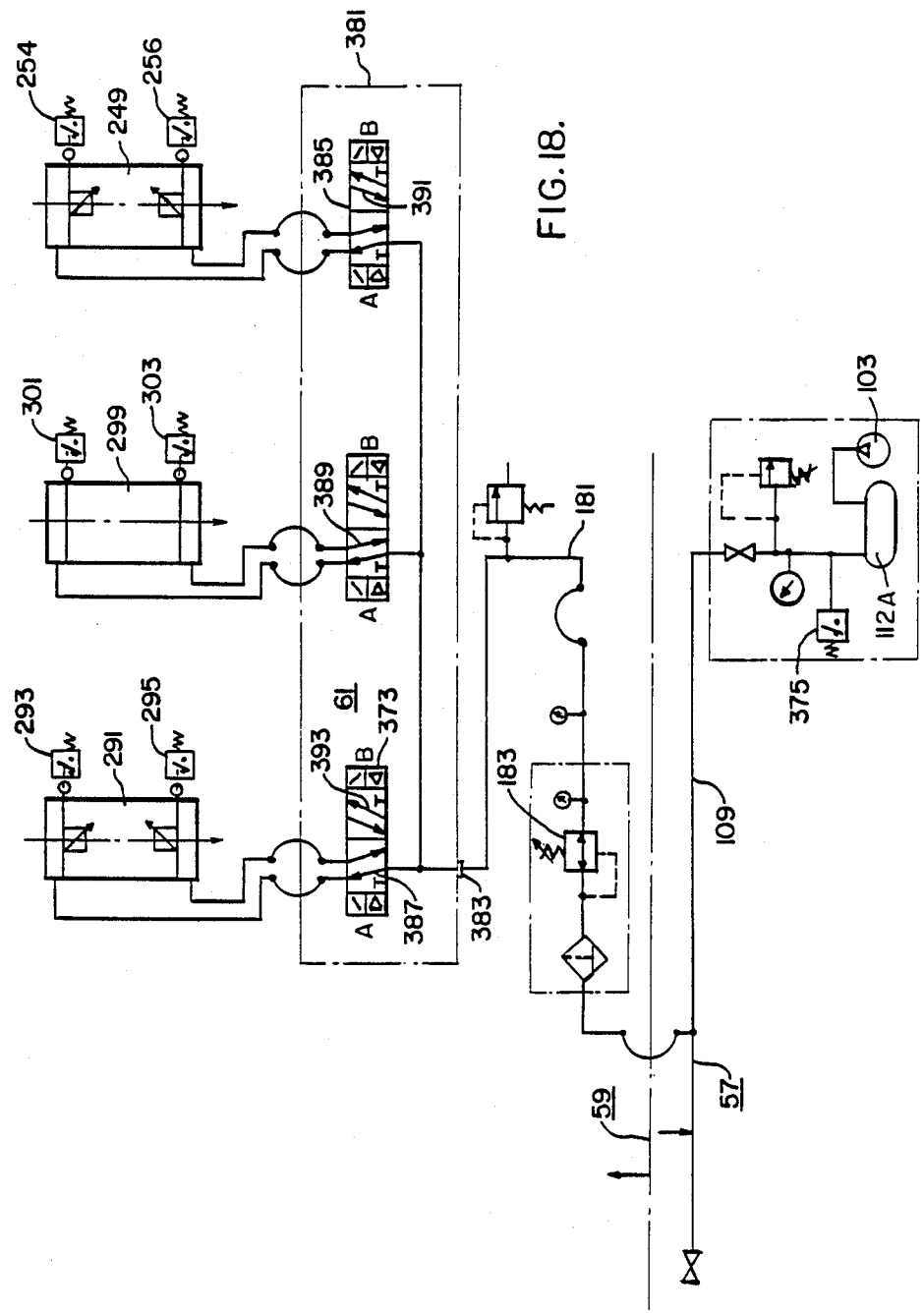
FIG. 18 is a schematic of the pressure fluid systems for operating the pistons which control the component-assembly handling mechanism of this invention.

The solenoids (not shown) for the valves which control the flow of compressed air to the cylinders 249, 291, 299 (FIG. 18).

The pulser 263 (FIG. 6) measuring the height of the elongated member 231.

The limit switch 271 (FIGS. 16, 16A) which verifies the calibration of the height of the elongated member:

The winch motor 265 (FIGS. 1, 2);

The pressure switches 375 (FIG. 18) on the compressed air line 109;

Limit switch 319 (FIGS. 14, 15) signalling displacement of supporting mast 201 from its initial position.

These conductors are combined in conduits 377 (FIGS. 22, 23) connected to the Y wire way 371. The conduits pass through the cable tray 347 (FIG. 22) to the junction box (FIG. 22) where they are connected to conductors which pass through wire way 353 and to junction box (not shown) under deck 92. At this junction box 154 the conductors are appropriately connected to the console 90.

The conductors from the pulsers 76 (FIG. 4) on the bridge 57 and 143 (FIG. 5) on the trolley 59 are connected directly to the junction box 154 and thence to the control console 90. The verification limit switches 86 (FIG. 9) operated by the bridge and 155 (FIG. 10) operated by the trolley are likewise connected to the control console through junction box 154.

The compressed air is distributed to the cylinders 249, 291, 299 through a manifold 381 (FIGS. 18, 25, 31). The hose 181 is connected to the input 383 of the manifold. The outputs of the manifold are delivered through valves 385 (FIGS. 18, 31), each of which is actuable by a solenoid 373. The valves 385 remain in the last position to which they are actuated. If solenoid A (FIG. 18) is last actuated, the flow is as shown in FIG. 18 into the upper terminal of a cylinder and out at the lower terminal as represented by arrows 387 and 389. If solenoid B is last actuated, the flow is into the lower terminal and out of the upper terminal as represented by the arrows 391 and 393. Four of the output hoses 395 (FIG. 31) are connected to inputs 397 of the upper hose reel 225. Two of the output hoses 398 are connected to the inputs 399 (FIG. 23) of the lower reel 222. The hoses 401 extending from the peripheral output of reel 225 supply compressed air selectively to the cylinder 299 for operating the grippers and to the cylinder 291 for operating the yoke 289 on the inner mast 281 (FIGS. 16, 18). The two peripheral hoses 403 from reel 222 supply compressed air selectively to operate the cylinder 249 for moving the rod 253 in tube 233 (FIGS. 16, 23).

While a preferred embodiment of this invention has been disclosed herein, many modifications thereof are feasible. This invention is not to be limited except insofar as is necessitiated by the spirit of the prior art.

We claim:

1. Apparatus for refueling a nuclear reactor, said reactor being disposed for refueling under water in a pit in a containment, the said apparatus including a bridge to be mounted moveably over said pit on said containment, first means connected to said bridge, for moving said bridge forward and backward on said containment over said pit along a first path, a first pulse generator, connected to said moving means, responsive to the movement of said bridge, for producing pulses, means, connected to said generator, for counting said pulses, the count of said pulses being dependent on the distance of the movement of said bridge, a trolley mounted moveably on said bridge, second means, connected to said trolley, for moving said trolley forward and backward on said bridge along a second path at an angle to said first path, a second pulse generator, connected to said second moving means, responsive to the movement of said trolley, for producing pulses, means, connected to said second generator, for counting said last-named pulses, the count of said last-named pulses being dependent on the distance of movement of said trolley, a mast assembly suspended from said trolley including parts moveable vertically with reference to said trolley, third means, connected to said parts, for moving said parts upwardly or downwardly, a third pulse generator, connected to said third moving means for producing pulses, and means, connected to said third generator, for counting said last-named pulses, the count of said pulses being dependent on the distance of movement of said parts, the count of the pulses produced by said first, second and third pulse generators determining the position of said parts relative to said reactor.

2. The apparatus of claim 1 wherein the position-determining means, connected to said first, second and third pulse generators includes means for assigning a polarity to the numbers of the pulses of each which is dependent on the direction of movement of the bridge, trolley and parts each with respect to a reference point.

3. Apparatus for refueling a nuclear reactor, said reactor being disposed for refueling under water in a pit in a containment, the said apparatus including a bridge to be mounted on said containment moveably over said pit, first means, connected to said bridge, for moving said bridge forward and backward on said containment over said pit along a first path, a first pulse generator, connected to said moving means, responsive to the movement of said bridge, for producing pulses, first counting means, connected to said first pulse generator, for counting said pulses, means, connected to said first counting means, for setting the polarity of the counts of said first counting means so that counts for the forward movement are of opposite polarity to counts of the backward movement, whereby the net count of said first counter is a measure of the distance of movement of said bridge from a predetermined reference point, a trolley mounted moveably on said bridge, second means, connected to said trolley, for moving said trolley forward and backward on said bridge along a second path at an angle to said first path, a second pulse generator, connected to said second moving means, responsive to the movement of said trolley, for producing pulses, second counting means, connected to said second pulse generator for counting said last-named pulses, means, connected to said second-counting means, for setting the polarity of its counts so that its counts for the forward movement of said trolley are of opposite polarity to its counts for the backward movement of said trolley, whereby the net count of said second counter is a measure of the distance of said trolley from a second predetermined reference point, and a refueling mast assembly suspended from said trolley moveable therewith, said first and second path defining a coordinate system whose points define the position of said mast with reference to said nuclear reactor.

4. Apparatus for refueling a nuclear reactor, said reactor being disposed for refueling under water in a pit in a containment, the said apparatus including a mast assembly for engaging, raising and lowering selected ones of component assemblies of said reactor of at least one type, a trolley, means on said trolley, connected to said mast assembly, for raising or lowering said mast assembly, first switch means having parts on said trolley and on said mast assembly which cooperate to actuate said switch means when said mast assembly reaches a predetermined first position, said first position being definable by a first coordinate, whose magnitude is measured from a predetermined reference point along said mast, a bridge, a first track on said bridge for said trolley, first drive means, connected to said trolley for moving said trolley forward and backward along said track, a second track for said bridge, said second track to extend along said containment so that said bridge and trolley are movable over said pit on said second track, second drive means connected to said bridge for moving said bridge forward and backward along said second track, said first and second tracks to extend along non-parallel paths, so that the movement of said bridge along said second track moves said mast assembly in a first direction along said second track and the movement of said trolley moves said mast assembly in a second direction along said first track at an angle to said first direction, the positions of said mast assembly, to which it may be moved along said tracks, being definable by a system of coordinates, each position of said mast assembly being definable by a second coordinate whose magnitude measures the distance, from a reference point, of a position of said mast assembly along said first track and a third coordinate whose magnitude measures the distance, from a reference point, of a position of said mast assembly along said second track, second switch means having parts on said trolley and at a predetermined second reference position, defined by a predetermined of said second coordinates, on said first track, said parts being cooperative to actuate said second switch means when said trolley moves through said second position, third switch means having parts on said bridge and at a predetermined third position, defined by a predetermined of said third coordinates, on said second track, actuable when said bridge moves through said third position, control means, said control means containing intelligence of reference magnitudes of first, second and third coordinates measuring the first, second and third positions where the first, second and third switch means would be actuated if the calibration of said apparatus were maintained, means, connecting said first, second and third switch means to said control means, for impressing on said control means the actual magnitudes of said first, second and third coordinates, and means, responsive to any deviation of a said actual magnitude from a said reference magnitude, for correcting the coordinate settings of said mast assembly to compensate for said deviation.

5. The apparatus of claim 4 wherein the mast assembly is raised and lowered by a hoist including a rotating member, the bridge is moveable along the tracks on the containment on wheels and the trolley is moveable along the tracks on the bridge on wheels, the said apparatus including a first pulser, connected to the rotating member, for producing a first train pulses responsive to the rotation of said rotating member, a second pulser, connected to at least one wheel of the bridge for producing a second train of pulses responsive to the rotation of said one wheel, and a third pulser connected to at least one wheel of said trolley, for producing a third train of pulses responsive to the rotation of said last-named one wheel, the said apparatus also including counting means for counting the pulses of each of said train of pulses, the positions of said mast, bridge and trolley from respective starting positions being determined by the respective counts of the first, second and third trains of pulses produced by said first, second and third pulsers respectively as the mast, bridge or trolley moves from a starting position to any position displaced from the starting position, a one-to-one relationship being maintained between the count of first, second or third trains of pulses and any position of the mast, bridge or trolley including the positions where the first, second or third switch means are actuable, the control means including a first, second and third reference count corresponding to the positions of said first, second and third switch means respectively, the deviation of the actual magnitude of a coordinate from a reference magnitude being the difference between the reference count and the actual count for the positions of the first, second and third switch means.

6. The apparatus of claim 4 wherein the raising or lowering means for the mast includes a first pulser for producing a first train of pulses responsive to the upward or downward movement of said mast, the first drive means includes a second pulser for producing a second train of pulses responsive to the forward or backward movement of the bridge and the second drive means includes a third pulser for producing a third train of pulses responsive to the forward or backward movement of said trolley, the said apparatus also including counting means for counting the pulses of each of said train of pulses, the positions of said mast, bridge and trolley from respective starting positions being determined by the respective counts of the first, second and third trains of pulses produced by said first, second and third pulsers respectively as the mast, bridge or trolley moves from a starting position to any position displaced from the starting position, a one-to-one relationship being maintained between the count of first, second or third trains of pulses and any position of the mast, bridge or trolley, including the positions where said first, second or third means are actuable, the control means including a first, second and third reference count corresponding to the positions of the first, second and third switch means respectively, the deviation of the actual magnitude of a coordinate from a reference magnitude being the difference between the reference count and the actual count for the positions of the first, second and third switch means.

7. Apparatus for refueling a nuclear reactor, said reactor being disposed for refueling under water in a pit in a containment, the said apparatus including a mast assembly for engaging, raising and lowering selected ones of component assemblies of said reactor of at least one type, a trolley, means on said trolley, connected to said mast assembly for suspending said mast assembly, a bridge, a first track on said bridge for said trolley, first drive means connected to said trolley for moving said trolley forward and backward along said first track, a second track for said bridge, said second track to extend along said containment so that said trolley and bridge are movable over said pit on said second track, second drive means, connected to said bridge, for moving said bridge forward and backward along said second track, said first and second tracks extending along non-parallel paths, so that the movement of said trolley along said first track moves said mast assembly in a first direction along said first track and the movement of said bridge along said second track moves said mast assembly in a second direction at an angle to said first direction, the positions of said mast assembly, to which it may be moved being definable by a system of coordinates, each position of said mast assembly being definable by a first coordinate whose magnitude measures the distance, from a reference point, of a position of said mast assembly along said first track (trolley track) and a second coordinate whose magnitude measures the distance, from a reference point, of a position of said mast assembly along said second track (bridge track), control means, means, connected to said trolley and to said bridge, for impressing on said control means the magnitudes of the first and second coordinates defining each position of said mast, first switch means having parts on said trolley and at a predetermined first reference position, defined by a predetermined of said first coordinates, on said first track, said parts being cooperative to actuate said first switch means when said trolley moves through said first position, second switch means having parts on said bridge and at a predetermined second reference position, defined by predetermined of said second coordinates, on said second track, actuable when said bridge moves through said second position, the said control means containing intelligence of reference magnitudes of said first and second coordinates measuring the first and second positions where the first and second switch means would be actuated if the calibration of the positions of said bridge and trolley were maintained, means, connecting said first and second switch means to said control means, for impressing on said control means the actual magnitude of said first and second coordinates, and means, responsive to any deviation of said actual magnitude from said reference magnitudes, for correcting the coordinate settings of said mast assembly to compensate for said deviations.

8. The apparatus of claim 7 wherein the first track and the second track are linear and extend at right angles to each other and the coordinate system is a Cartesian coordinate system.

9. The apparatus of claim 8 wherein the part of the first switch means on the trolley is a first limit switch and the part of the first switch means in the first track is a first cam which actuates the first limit switch where the trolley passes over the first cam and the part of the second switch means on the bridge is a second limit switch and the part of the second switch means on the second track is second cam which actuates the second limit switch when the bridge passes over the second cam.

10. The apparatus of claim 7 wherein the means for impressing on the control means, the magnitudes of the first and second coordinates defining the positions of the mast assembly includes a first means, connected to the first drive means (for the trolley) for producing a first train of pulses whose number measures, on one-to-one relationship, the first coordinate for each position, including the position of the first switch means, of the mast assembly along the first track and second means, connected to the second drive means (for the bridge) for producing a second train of pulses whose number measures, in one-to-one relationship, the second coordinate for each position including the position of the second switch means, of the mast assembly along the second track, the reference magnitudes being a number each for the first and second coordinates which, if the calibration is maintained, is equal to the number of the corresponding train of pulses at the positions of the first and second switch means respectively.

11. The apparatus of claim 10 wherein the drive means includes wheels on the trolley and bridge, the first pulse-train-producing means including a first pulser, connected to at least one wheel of the trolley, to be actuated thereby to produce the first train of pulses in accordance with the rotation of said one wheel and the second pulse-train-producing means including a second pulser, connected to at least one wheel of the bridge, to be actuated thereby to produce the second train of pulses in accordance with the rotation of said last-named one wheel.

* * * * *